United States Patent Office 2,996,142
Patented Aug. 15, 1961

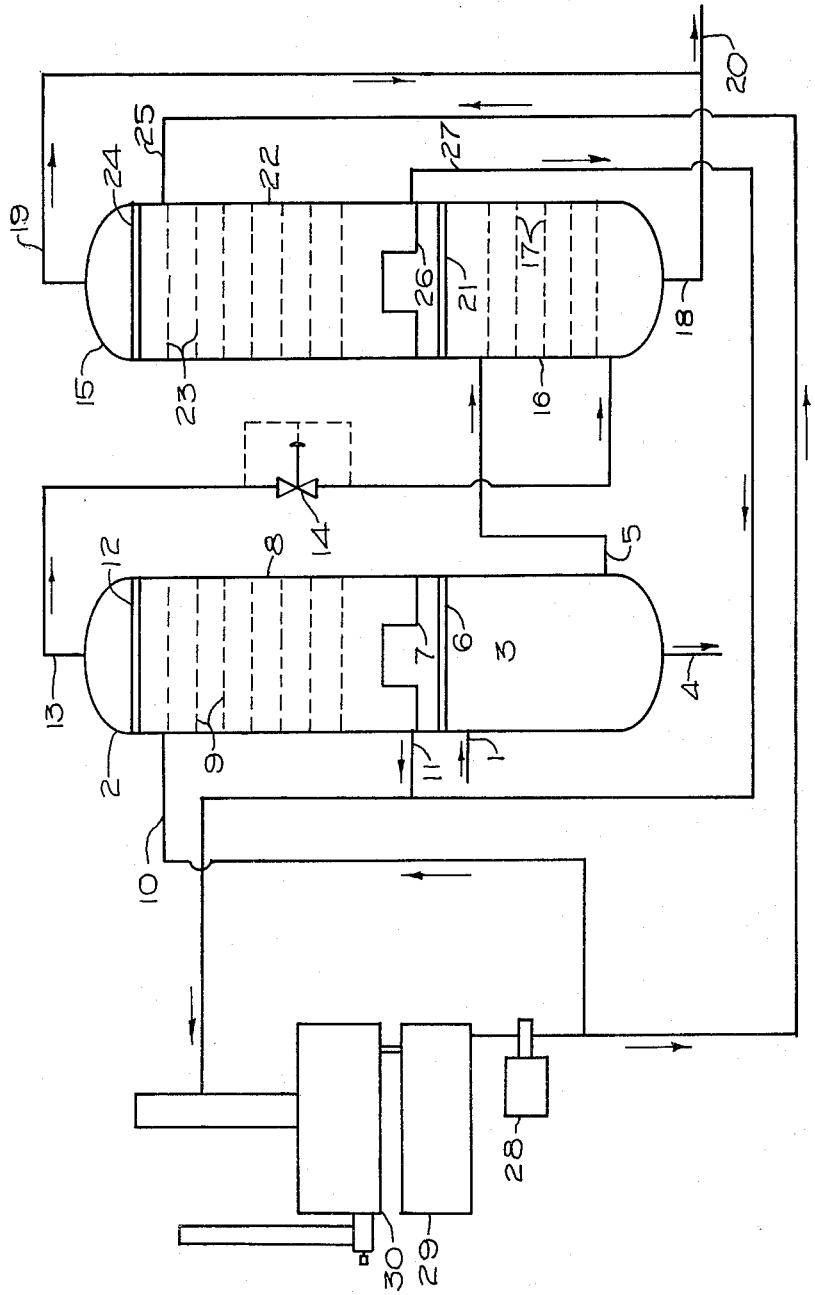

2,996,142
METHOD AND APPARATUS FOR DEHYDRATING HYDROCARBON CONDENSATE
Marvin S. Worley, Oklahoma City, Okla., assignor to Black, Sivalls & Bryson, Inc., Kansas City, Mo., a corporation of Delaware
Filed May 28, 1958, Ser. No. 738,548
5 Claims. (Cl. 183—2)

The present invention relates generally to the dehydration of fluid streams and particularly to the dehydration of natural gas and natural gas condensate streams.

Natural gas production usually is saturated with water and since production temperatures are usually above normal atmospheric temperatures, the natural gas produced will contain free water as soon as it reaches the surface of the earth. Natural gas is produced as a fluid stream containing hydrocarbon gases, hydrocarbon liquid condensates, water vapor and water condensates. Normally such natural gas streams are processed by first separating the liquids from the gases and then dehydrating the gas stream to prevent the collection of free water in the gathering pipeline systems. Since most of the water will readily separate from the hydrocarbon condensates, it will be separated from the hydrocarbon condensates and separately discharged. The separated hydrocarbon condensates are then usually reintroduced into the gas stream for transportation to a processing plant. The hydrocarbon condensate which has been reintroduced into the natural gas stream will contain some water. There are two sources accounting for this water, solution water in the water saturated hydrocarbon condensate and mechanically entrained, relatively small water droplets in the hydrocarbon condensate.

Difficulties arise in the transporting of such fluid streams since the water will collect in low places in the pipeline. This free water forms from the cooling of the water saturated condensate just as free water forms when water saturated gas is cooled. The free water collects at the low spots in the flow line at low gas rates. Before the quantity becomes sufficient to be picked up by the gas stream a hydrocarbon condensate cap will form over it, preventing it from being vaporized into the gas stream. When the collected volume becomes great enough, the gas will pick it up and carry it down the line allowing the gas to vaporize some of the water thereby raising the dewpoint of the gas. The throttling of such a stream at a central plant or collection point often is sufficient to cause the formation of gas hydrates and the subsequent interruption of flow of the natural gas fluid stream.

Therefore, the primary object of the present invention is to provide a method and an apparatus for dehydrating a natural gas stream. A further object of the present invention is to provide a method and an apparatus for removing water and water vapor from both the gaseous and the liquid components of a natural gas stream. A still further object of the present invention is to provide an improved method and apparatus for dehydrating a natural gas stream wherein finely entrained and solution water are removed from the hydrocarbon condensate. Still another object of the present invention is to provide an improved method and apparatus for dehydrating a natural gas stream wherein the hydrocarbon condensates are dehydrated by intimate contact with a relatively dry gas stream. Another object of the present invention is to provide a method and apparatus for dehydrating a natural gas stream wherein the hydrocarbon condensates are contacted with a portion of the dehydrated gas to dry the condensates.

In accomplishing these and other objects of the present invention I have provided improved method and apparatus illustrated in the accompanying drawing wherein:

The figure is a schematic flow diagram of the system of the present invention.

Referring more in detail to the drawing:

The natural gas stream to be dehydrated is conducted through duct 1 into vessel 2. A three phase separation is accomplished in the lower portion of vessel 2 hereinafter referred to as separation section 3 of vessel 2. Separated water is discharged from separation section 3 through water outlet 4. Hydrocarbon condensate is discharged from separation section 3 through duct 5. The separated gas flows upwardly through mist eliminator 6 and chimney tray 7 into upper contacting section 8 of vessel 2. A plurality of contacting trays 9 or other suitable contacting means is provided in contacting section 8 to provide intimate contact between the separated gas and any liquid dehydrating agent such as diethylene glycol.

Lean dehydrating agent is introduced into contacting section 8 of vessel 2 through duct 10. Rich dehydrating agent collects on chimney tray 7 after contacting the gas stream on trays 9 and is discharged therefrom through duct 11. The gas, after being dehydrated by contacting section 8, flows through mist eliminator 12 and is discharged from vessel 2 through gas outlet duct 13.

The dehydrated gas flows through duct 13 under the control of differential pressure controller 14 into the lower portion of vessel 15 hereinafter referred to as stripping section 16 of vessel 15. Hydrocarbon condensate which is discharged from vessel 2 through duct 5 flows into the upper portion of stripping section 16 of vessel 15 wherein the dry gas stream is intimately contacted with the hydrocarbon condensate on trays 17. This intimate contact will remove substantially all of the water from the hydrocarbon condensate including both entrained and solution water. The dried hydrocarbon condensate is discharged from vessel 15 through condensate discharge duct 18 which connects with gas discharge duct 19 to form pipeline 20.

The gas stream discharged from the upper of trays 17 at least partially saturated with water vapor absorbed from the condensate and flows through mist eliminator 21 into contacting section 22 of vessel 15. The gas stream is contacted on trays 23 of contacting section 22 by a dehydrating agent. The gas stream leaving the upper of trays 23 flows through mist eliminator 24 and is discharged from vessel 15 through gas discharge duct 19 into pipeline 20. Lean dehydrating agent is pumped through inlet duct 25 onto the uppermost of trays 23 in contacting section 22 of vessel 15. After contacting the gas stream on trays 23, rich dehydrating agent collects on chimney tray 25 and is discharged from vessel 15 through outlet 27.

Pump 28 is connected to dehydrating agent reservoir 29 and to inlet ducts 10 and 25 to deliver lean dehydrating agent to both vessels 2 and 15. Outlet ducts 11 and 27 both connect into dehydrating agent reconcentrator 30. The rich dehydrating agent is reconcentrated therein and returned to reservoir 29 for storage and recirculation to vessels 2 and 15.

In operation it has been found that the initial gravity separation of water from hydrocarbon condensate such as that performed in separation section 3 of vessel 2 will remove all but a small portion of the water from the hydrocarbon condensate but no separation device which is practical for use on natural gas production will remove all of the entrained water and solution water. As previously explained the amounts of water remaining in the hydrocarbon condensate usually would not justify additional attention to perfect their complete removal except in situations where the transportation of the separated natural gas and hydrocarbon condensate will cause some of this water to separate in the pipeline and thereafter possibly contribute to flow stoppage resulting from the formation of gas hydrates.

The present invention has made adequate provision for the removal of water entrained and in solution in the hydrocarbon condensate in the processing of a natural gas stream. Further, this invention dehydrates the hydrocarbon condensate by the stripping action of a dried gas stream preferably the gas stream from which the hydrocarbon condensate has been separated.

It is suggested that the flow of dehydrating agent to vessels 2 and 15 be regulated to obtain the desired degree of dehydration (dewpoint depression) of the natural gas stream. Also, differential pressure controller 14 should be set to control the pressure drop between vessels 2 and 15 to a minimum necessary to maintain the continued flow of the gas stream and the hydrocarbon condensate.

What I claim and desire to secure by Letters Patent is:

1. The method of dehydrating a natural gas stream comprising, separating free water from said stream, contacting the gaseous component of said stream with a dehydrating agent to remove water from said gaseous component, contacting the liquid component of said stream with the dried gaseous component to remove water from said liquid component and contacting said gaseous component subsequent to its contact with said liquid component with a dehydrating agent to remove water from said gaseous component.

2. The method of dehydrating a natural gas stream comprising, separating the gaseous component from the liquid component of the natural gas stream, separating the free water from the separated liquid component of said natural gas stream, stripping water from said liquid component with a dried gas stream, contacting the gaseous component of said natural gas stream with a dehydrating agent to remove water and water vapor therefrom and to provide a dried gas stream for stripping water from said liquid component, and contacting the gas stream after said stripping with a dehydrating agent to remove water from said gas stream.

3. A natural gas dehydrator comprising, a gas-water-hydrocarbon condensate separator, a first contacting device for providing contact between separated gas and a dehydrating agent, a stripping device, a second contacting device, means conducting gas from said separator to said first contacting device, means conducting hydrocarbon condensate from said separator to said stripping device, means conducting gas from said first contacting device to said stripping device, means conducting gas from said stripping device to said second contacting device, means discharging dehydrated hydrocarbon condensate from said stripping device, means supplying a dehydrating agent to both said first and said second contacting devices and means discharging dehydrated gas from said second contacting device.

4. A natural gas dehydrator comprising, a first vessel, a second vessel, an inlet into said first vessel, a water outlet from said first vessel, a hydrocarbon condensate outlet from said first vessel connecting into said second vessel, means in said first vessel to dehydrate the gas from which free water and hydrocarbon condensate have been separated, a dried gas outlet from said first vessel connecting to said second vessel, means in said second vessel to provide a stripping of water from said hydrocarbon condensate with said dried gas, means in said second vessel to dehydrate the gas used for stripping said hydrocarbon condensate, means discharging dried gas from said second vessel and means discharging stripped hydrocarbon condensate from said second vessel.

5. A natural gas dehydrating device comprising, a first vessel, a second vessel, a lower separation section and an upper contacting section in said first vessel, a lower stripping section and an upper contacting section in said second vessel, means connecting a natural gas stream into said separating section of said first vessel, means for discharging separated water from said separating section, means conducting separated hydrocarbon condensate from said separating section of said first vessel to said stripping section of said second vessel, a gas passageway between said separating section and said contacting section in said first vessel, means associated with said contacting section in said first vessel to provide contact between gas and a dehydrating agent, means for conducting gas from said contacting section of said first vessel to said stripping section of said second vessel, means discharging stripped hydrocarbon condensate from said stripping section of said second vessel, a gas passageway from said stripping section to said contacting section of said second vessel, means associated with said contacting section in said second vessel to provide contact between gas and a dehydrating agent, means supplying lean dehydrating agent to both of said contacting sections, and means discharging dehydrated gas from said contacting section of said second vessel.

References Cited in the file of this patent

UNITED STATES PATENTS

| | | |
|---|---|---|
| 1,855,615 | Sperr | Apr. 26, 1932 |
| 2,420,115 | Walker | May 6, 1947 |
| 2,428,643 | Young | Oct. 7, 1947 |
| 2,793,751 | Broidrick | May 28, 1957 |